United States Patent Office.

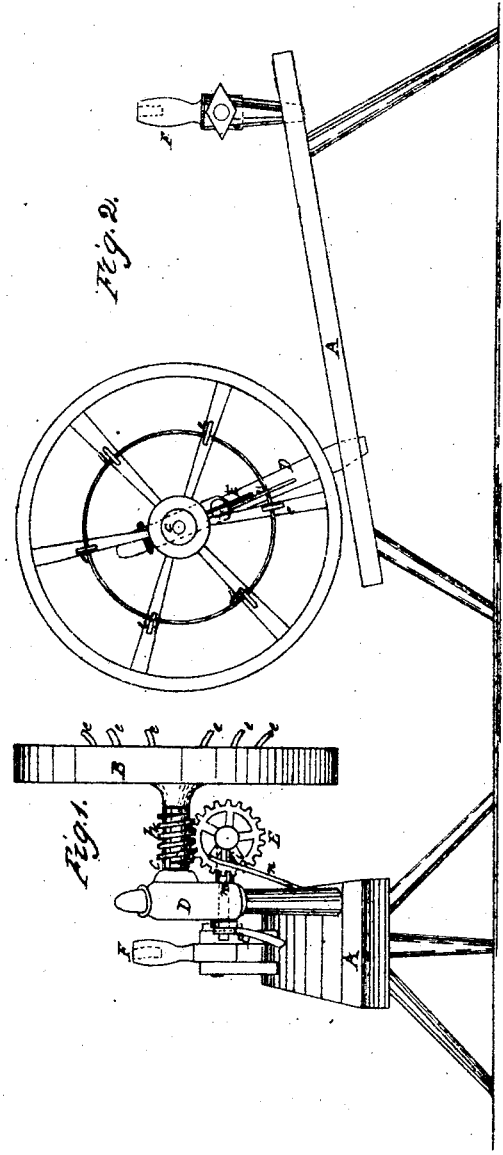

G. BRADWAY AND N. BRADLEY, OF MAQUOKETA, IOWA.

Letters Patent No. 76,043, dated March 31, 1868.

IMPROVEMENT IN REELS.

*The Schedule referred to in these Letters Patent and making part of the same.*

TO ALL WHOM IT MAY CONCERN:

Be it known that we, G. BRADWAY and N. BRADLEY, of Maquoketa, in the county of Jackson, and State of Iowa, have invented a new and improved Combined Reel and Spinning-Wheel; and we do hereby declare that the following is a full, clear, and exact description thereof, which will enable others skilled in the art to make and use the same, reference being had to the accompanying drawings, forming part of this specification, in which—

Figure 1 is an outside view of our combined wheel and reel.

Figure 2 is an end view.

Similar letters of reference indicate like parts.

This invention relates to a combination of a reel with an ordinary spinning-wheel by attaching reel-heads to the spokes of the wheel and connecting worm-wheel gearing for making the cut of yarn. The machine may be used either as a reel or spinning-wheel by throwing the worm-wheel in or out of gear, and while occupying no more space than a common wheel, it can be made much cheaper than a separate reel and wheel, and be equally useful for the purposes of both.

A represents the bench, and B an ordinary spinning-wheel, hung, as usual, on a spindle, $c$, to the standard D. On the spokes of the wheel, on either side, are placed hank-hooks or reel-heads $e$, one of which is made to turn to take off the yarn. A worm, $h$, placed on the spindle $c$, works into a cog-wheel, E, hung upon an arm, $m$, projecting from the standard D. A pin, $i$, is set on the side of the cog-wheel E, near its edge, which strikes the snap-spring $n$ as it passes, to mark the cut which is made in three snaps of the spring.

When the reel is not used, the cog-wheel E can be thrown out of gear by unscrewing the tail-nut $p$, which fastens the arm $m$ to the standard, and turning the cog-wheel towards the head F, out of the way of the spinning-wheel.

Having thus described our invention, we claim as new, and desire to secure by Letters Patent—

The combination and arrangement of stand D, spindle $c$, and wheel B, having hooks $e$ and worm $h$, with wheel E, pin $i$, shaft $m$, nut $p$, and spring $n$, as and for the purpose set forth.

G. BRADWAY,
N. BRADLEY.

Witnesses:
JOHN A. SLIPPER,
JAMES HALLEY.